United States Patent
Kumar (10) Patent No.: US 11,290,580 B2
(45) Date of Patent: Mar. 29, 2022

(54) ATTACHMENT MODULE FOR DETACHABLY COUPLING WITH A MOBILE DEVICE

(71) Applicant: Khyber Technologies Corporation, Sharon Center, OH (US)

(72) Inventor: Rajendra Kumar, Sharon Center, OH (US)

( * ) Notice: Subject to any disclaimer, the term of this patent is extended or adjusted under 35 U.S.C. 154(b) by 0 days.

(21) Appl. No.: 16/648,225

(22) PCT Filed: Sep. 18, 2018

(86) PCT No.: PCT/US2018/051484
§ 371 (c)(1),
(2) Date: Mar. 17, 2020

(87) PCT Pub. No.: WO2019/055976
PCT Pub. Date: Mar. 21, 2019

(65) Prior Publication Data
US 2020/0288001 A1      Sep. 10, 2020

Related U.S. Application Data

(60) Provisional application No. 62/559,680, filed on Sep. 18, 2017.

(51) Int. Cl.
*H04M 1/02*  (2006.01)
*A45C 11/00*  (2006.01)
*H04R 1/10*  (2006.01)

(52) U.S. Cl.
CPC .......... *H04M 1/0258* (2013.01); *A45C 11/00* (2013.01); *H04R 1/105* (2013.01);
(Continued)

(58) Field of Classification Search
CPC . H04M 1/6058; H04M 1/0258; H04M 1/0254
See application file for complete search history.

(56) References Cited

U.S. PATENT DOCUMENTS 6,952,617 B1   10/2005   Kumar
7,149,543 B2   12/2006   Kumar
(Continued)

OTHER PUBLICATIONS

Nova Technology. PodCase—Battery Case for Your iPhone and AirPods. Oct. 7, 2017. [retrieved on Jun. 24, 2020]. Retrieved from internet:-<https://www.kickstarter.com/projects/581404323/podcase-battery-case-for-your-phone-and-airpods/?ref=kicktraq>.
(Continued)

*Primary Examiner* — Keith Ferguson
(74) *Attorney, Agent, or Firm* — Black, McCuskey, Souers & Arbaugh LPA (57) ABSTRACT

An attachment module, having a fixing mechanism, couples detachably with a mobile device, thereby enabling a user to carry the module attached or detached from the mobile device. In at least one embodiment, the fixing mechanism includes an adhesive portion that binds the module to the mobile device. In at least one embodiment, the module holds a pair of wireless earphone to the mobile device in a position where the earphone speaker portion is generally positioned in line with the depth of the mobile device, thereby only minimally adding to the depth of the combined unit. In at least one embodiment, the module may be equipped with wired or wireless charging to charge its battery or that of the mobile device.

6 Claims, 6 Drawing Sheets

(52) U.S. Cl.
CPC ... *A45C 2011/001* (2013.01); *A45C 2011/002* (2013.01); *A45C 2011/003* (2013.01); *H04R 2420/07* (2013.01); *H04R 2499/11* (2013.01)

(56) References Cited

U.S. PATENT DOCUMENTS

| | | | |
|---|---|---|---|
| 8,483,755 B2 | 7/2013 | Kumar | |
| 8,891,800 B1 | 11/2014 | Shaffer | |
| 9,490,859 B2* | 11/2016 | Peel | H04B 1/3877 |
| 9,906,851 B2* | 2/2018 | Schrems | H04M 1/0256 |
| 2016/0072933 A1* | 3/2016 | Cox, III | G06F 1/1656 |
| | | | 455/575.8 |
| 2017/0064429 A1 | 3/2017 | Hirsch et al. | |
| 2017/0231345 A1 | 8/2017 | Gronewoller et al. | |
| 2018/0028909 A1* | 2/2018 | Kim | A63F 13/285 |
| 2018/0262826 A1* | 9/2018 | Ingram | H04B 1/3888 |

OTHER PUBLICATIONS

AgentWhiteUSA. AgentWhiteUSA Cell Phone Wallet, Stick on Wallet For Credit Card, Business Card and Id, Works with Almost Every Phone, iPhone, Android and Most Smartphones, Grey/Black/White. Amazon. Reviewed Apr. 10, 2017. [retrieved Jun. 24, 2020]. Retrieved from the internet: <URL: https://www.amazon.com/AgentWhiteUSA-Wallet-Business-Android-Smartphones/dp/B06XCXPCTH/ref=pd_lpo_vtph_1_07_bs_t_1?_encoding=UTF8&psc=1&refRID=VZJF65SOHAOZXF7CKF07>.

International Search Report and Written Opinion of the International Searching Authority, dated Dec. 6, 2018. Report received in the case of corresponding PCT application.

OEM LG Decoy 8610 Bluetooth Headset—Blue without charger (Bulk Packaging). [retrieved on Jul. 28, 2020]. Retrieved from the Internet: <https://www.overstock.com/Electronics/OEM-LG-Decoy-8610-Bluetooth-Headset-Blue-without-charger-Bulk-Packaging/13355637/product.html>.

MoGo Talk Bluetooth Headset and Protective Case for iPhone 3G and 3GS (Black). [retrieved on Jul. 28, 2020]. Retrieved from the Internet: <https://www.amazon.com/Bluetooth-Headset-Protective-iPhone-Black/dp/B002VDG206>.

* cited by examiner

ATTACHMENT MODULE FOR DETACHABLY COUPLING WITH A MOBILE DEVICE

CROSS-REFERENCE TO RELATED APPLICATIONS

This application is the U.S. National Stage Entry of PCT Application PCT/US18/51484, filed Sep. 18, 2018, and which claims priority to and the benefit of U.S. Provisional Application 62/559,680, filed Sep. 18, 2017, the contents of which are hereby incorporated by reference in their entirety.

BACKGROUND

This relates in general to mobile devise and earphones.

Earphones include a variety of devices, such as wireless headphones, Bluetooth headsets, wireless headsets, wireless earbuds, wireless earphones, and more recently as true wireless earbuds, and the like. At least one class of earphones includes wireless devices that include one of more of the following components: a microphone, a speaker, support electronics, and a battery power source, and may be wearable directly in the ear. Examples of such wireless earphones are AirPods devices made by Apple of Cupertino, Calif. and Elite Sports model made by Jabra, GN Group of Copenhagen, Denmark.

This also pertains to the mobile devices for which the above-described earphones act as audio extensions. Examples of such mobile devices include: smart phones, tablet devices, and laptop computers, and the like, such as Apple iPhones and iPads, and Google Android based smartphones and tablet devices from Samsung, LG, Lenovo, and Huawei.

More particularly, this pertains to a combination of the above-described two types of devices where, for example, one or two earphones are be stored with the mobile device when not in use. Two patents in this space are U.S. Pat. Nos. 6,952,617 and 7,149,543, both to the present inventor. Additionally, U.S. Pat. No. 8,483,755, to the same, teaches a pair of stereo wireless headsets carried in recessed slots made on a mobile device.

Some examples of commercial version of such combination devices are: (1) LG model Decoy, introduced in 2008, included a headset in a popular form-factor, docking into a recessed portion of a mobile phone of modified form-factor. The product was later discontinued without any succession. The product relied upon a recessed docking port within the phone's housing, which made the mobile device form-factor considerably odd and difficult to implement in succeeding products, especially in contrast to the design of modern-day smartphones. (2) Newton Peripheral model MoGo Headset, which was introduced in 2009, included a headset of ultra-low profile, docking into a recessed portion of an add-on case for certain smartphones. This product too was later discontinued. This product employed an odd shaped headset having a totally new and untried form factor.

A recent U.S. patent, U.S. Pat. No. 8,891,800, titled Earbud Charging Case For Mobile Device, teaches a smartphone case somewhat similar to the MoGo Headset model described above.

The prior art teaches attaching earbuds behind a mobile device, thereby resulting in a substantially thicker combined unit due to stacking of the depth of mobile device and the earbuds. Another other problem with most of the prior art is that they teach specific embodiments employing mobile devices and earphones of special form-factors, and not commercially available mobile devices and earphones, thereby making their commercialization significantly more difficult.

Additionally, earbuds typically have rounded shape which, and when added to the depth of a mobile device, at taught by the prior art, results in a bulky combined unit.

SUMMARY

This relates more particularly to an attachment module for coupling at least one wireless earphone with a mobile device.

In at least one embodiment, an attachment module for coupling at least one wireless earphone with a mobile device includes a generally planar main body having an interior side for facing a back surface of the mobile device and an exterior side facing opposite the interior side and has a first end for engaging a first edge of the mobile device. The module includes an earphone retaining mechanism extending beyond the first end for detachably holding the at least one wireless earphone in a position where a speaker portion of the earphone is positioned beyond a plane defined by the interior side.

In at least one embodiment, the attachment module further includes a fixing mechanism for securing the main body to the mobile device. The fixing mechanism may be an adhesive that binds the main body to the back side of the mobile device. The adhesive may form a double-sided tape. The main body may include a recess where the double-sided tape is disposed. The double-sided tape may be detachable from at least one of the main body and the back side of the mobile device.

In at least one embodiment, the main body includes a second end for engaging a second edge of the mobile device opposite the first edge, and the fixing mechanism incudes at least one securing arm formed at at least one of the first and second ends for securing the main body to the mobile device. A portion of the main body including the securing arm may be detachable from a remaining portion of the main body.

In at least one embodiment, the main body may further include arms extending orthogonally from the first end and in opposite directions for engaging third and fourth edges of the mobile device extending orthogonally form the first edge. The arms may flex for detachment from the mobile device.

In at least one embodiment, the attachment module further includes a power management circuit disposed in the main body. The circuit includes a first connection for connecting an external power source to the power management circuit. The power management circuit is capable of charging at least one of the mobile device and the earphone. The first connection may be a wired connection or a wireless connection, for example a wireless connection for inductive charging. The power management circuit may include a second connection for connecting to the mobile device, either wired or wirelessly. The power management circuit may include a third connection for connecting to the earphone, either wired or wirelessly. For example, the earphone retaining mechanism may include at least one electrical connecter for wired charging of the earphone. A battery may be disposed in the main body and connected to the power management circuit to store power from the circuit and provide power to the circuit. In at least one embodiment, the power management circuit may use power from the mobile device to charge the earphone.

In at least one embodiment, the main body defines an earphone storage cavity surrounding the earphone retaining mechanism. The module may include a lid for covering the earphone storage cavity.

Various aspects will become apparent to those skilled in the art from the following detailed description and the accompanying drawings.

DETAILED DESCRIPTION

In at least one embodiment, an attachment module for coupling at least one earphone, for example a wireless earphone, with a mobile device includes a fixing mechanism for securely attaching the module to the mobile device, and a retaining mechanism for detachably holding the earphone in a position where the bulk of the earphone speaker portion is positioned in line with the depth of the mobile device. Thus, the speaker portion of the earphone minimally adds to the depth of the combined unit relative to the depth of the mobile device alone.

For example, the fixing mechanism can be one of several mechanisms. For example, the fixing mechanism can be a portion of the module having an adhesive, such as adhesive tape or a double-sided adhesive tape, that binds the module to the mobile device. The portion with the adhesive tape can be made detachable from the remaining portion of the module.

Alternatively, or additionally, the fixing mechanism can have one or more securing arm extending from the main body of the module for holding the module to the mobile device. Optionally, the securing arm portion can be made detachable from the remaining portion of the module.

In at least one embodiment, the main body of the module extends to form a case or partial case for the mobile device, for example by arms that extend from the main body to engage edges of the mobile phone. Portions forming the case for the mobile devices can be made detachable from the remaining portion(s) of the module.

In at least one embodiment, the attachment module has a first connection for connecting to an external charging source. The module may include a second connection for charging the mobile device when attached to the module, and may include a third connection for charging the earphone when held to the module. These connections may each be wired or wireless, and may be inductive charging. Additionally, the attachment module may include a battery connected to the said power management circuit to store or provide power.

In at least one embodiment, the retaining mechanism is configured such that a noticeable portion of docked earphone is visible with the front of the mobile device, thereby highlighting the docked earphone feature of the mobile device and making it easily identifiable and marketable. It may be that the speaker portion of the earphone is forward facing. In at least one example, the retaining mechanism is configured such that when holing an earphone, the speaker portion of the earphone faces in the same direction as an interior surface of the main body of the module.

Referring now to the drawings, there is a first embodiment shown in FIGS. 1A, 1B, 1C, 2, and 3 of a portable combination device 10, including a mobile device 20, an earphone 30, and an attachment module 40. A display 21 is shown visible from a front side of the mobile device 20.

Figures 1A, 1B, 1C, 2, 3:
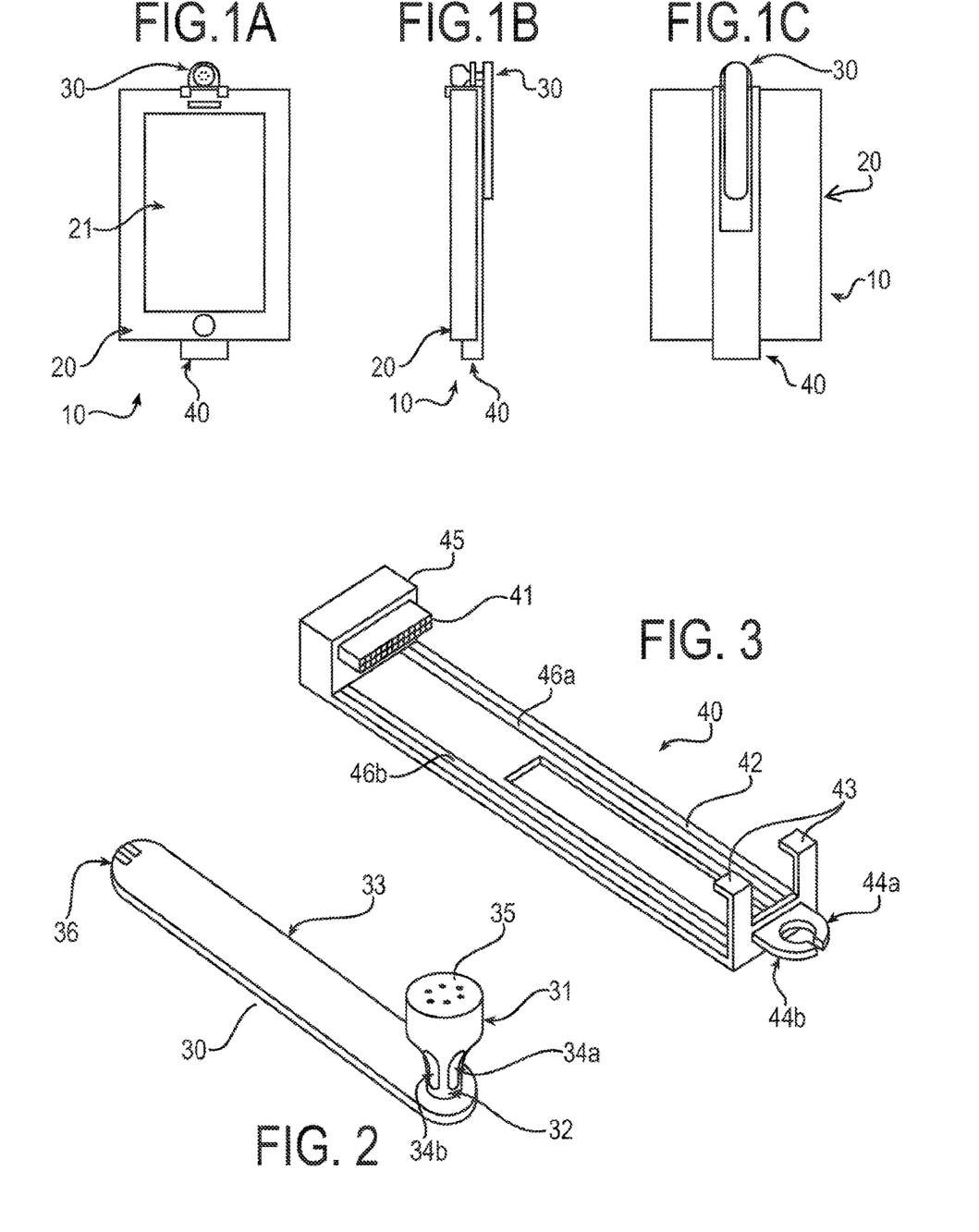
FIG. 1A is a front view of a combination of a mobile device, an attachment module, and an earphone.
FIG. 1B is a side view of the combination of FIG. 1A.
FIG. 1C is a back view of the combination of FIG. 1A.
FIG. 2 is a perspective view of the earphone of FIG. 1A.
FIG. 3 is a perspective view of the attachment module of FIG. 1A.
Figures 4, 5:
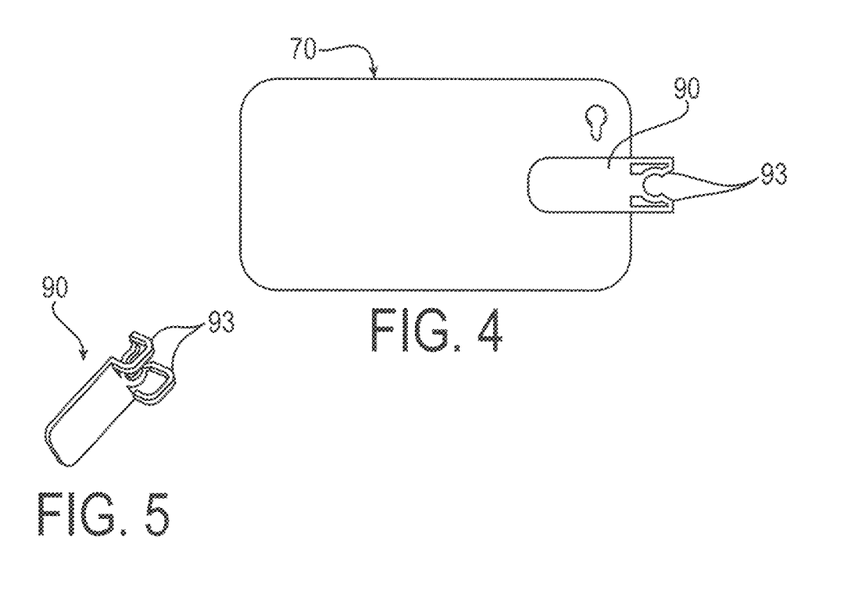
FIG. 4 is a rear view of another combination of a mobile device, and an attachment module.
FIG. 5 is a perspective view of the attachment module of FIG. 4.
Figure 6A:
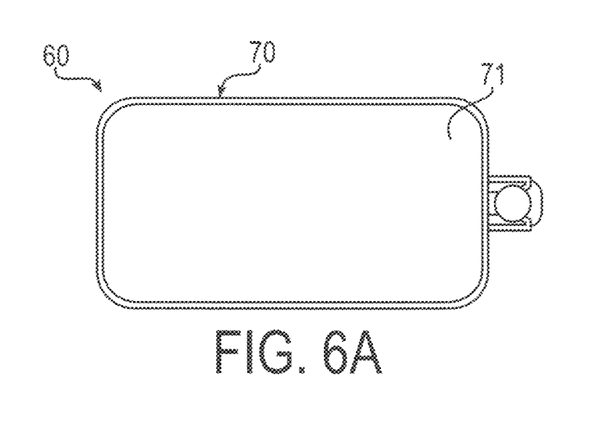
FIG. 6A is a front view of the combination of FIG. 4 including an earphone.
Figure 6B:
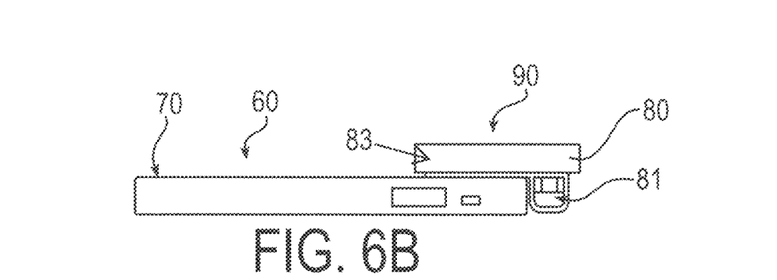
FIG. 6B is a side view of the combination of FIG. 6A.
Figure 6C:
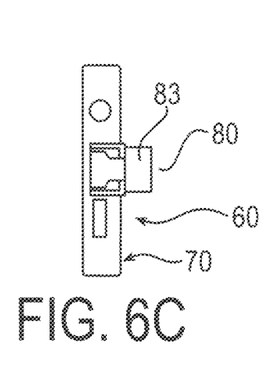
FIG. 6C is a top view of the combination of FIG. 6A.

As best shown in FIG. 2, the earphone 30 includes a speaker portion for producing audio, embodied as an earbud 31, having an internal speaker (not shown) behind speaker grill 35, although such particular arrangement not required. The earphone 30 also includes an internal microphone (not shown) behind microphone grill 36, although such particular arrangement is not required, for receiving audio. The earbud 31 is generally formed and sized to fit in a user's outer ear, and connects to the earphone arm 33 through a reduced neck 32. The neck 32 includes optional charge terminals 34a and 34b. The charge terminals 34a and 34b are internally connected to an embedded battery power of the earphone 30 (not shown).

As best shown in FIG. 3, the attachment module 40 includes a main body portion 42 extending between a first end, e.g. retaining-end 43, and a second end, e.g. connector-end 45. The generally planar main body 42 has an interior side for facing a back surface of the mobile device 20 and an exterior side facing opposite the interior side. The retaining end 43 can engage a first edge of the mobile device 40 when coupled.

The module 40 includes an earphone retaining mechanism including earphone clips 44a and 44b. In operation, the earphone clips 44a and 44b are formed to fit around the neck portion 32 of the earphone 30 to securely holding the earphone in place when not in use. The earphone clips 44a, 44b may be constructed of conductive material, at least in part. The clips 44a, 44b may include connections that carry power through the main body 42 to the earphone 30 Thereby, the earphone 30 may be charged while coupled with the mobile device 20. In such an arrangement, connector-end 45 may have a connector 41 to interface with the mobile device 20. Power may be drawn from the mobile device 20 to charge the ear phone 30. Additionally, or alternatively, the module may include a connection to an external power source and may provide power to the mobile device 20 or the earphone 30 to charge from the external power source.

As shown in FIGS. 1A, 1B, and IC, in at least one arrangement, the mobile device 20 is held between the connector 41, which is plugged into a device connector (not shown) of the mobile device, and the retaining end 43. The earphone 30 docks onto the mobile device 20 by snapping into the earphone clips 44a and 44b.

It must be understood, that, as shown in this illustrated example, in at least one embodiment, the speaker portion, e.g. earbud 31, is positioned from the retaining mechanism, e.g. clips 44a, 44b, in position beyond a plane defined by the interior side of the main body 42. Further, in this particular example, the in the docked state, the earbud 31 of the earphone 30 is generally positioned in line with the overall planar length of the mobile device 20. It must also be understood, as illustrated and explained in the above arrangement, the earbud 31 of the docked earphone 30 is visible with the front (the side with the display 21) of the mobile device 20.

There is a second embodiment shown in FIGS. 4, 5, 6A, 6B, and 6C. A combination unit 60, includes a mobile device 70 with an attachment module. The attachment module, e.g. headset holder 90, includes a flexible clip 93. The holder 90 may be mounted on the back of a mobile device 70 via an adhesive, such as double sided adhesive tape (not shown). The holder 90 may include a recess in which the adhesive is disposed between the holder 90 and the mobile device 70.

The combination unit 60 has a headset 80 clipped into the headset holder 90. The headset 80 has an earbud portion 81, which is held in the flexible clip 93. This exemplary embodiment is illustrated with the speaker portion, e.g. earbud 81, in line with the mobile device main planar length of the mobile device 70. The remaining portion 83 of the earphone, e.g. headset 80, is shown behind the mobile device 70. In this arrangement, it is noted that, when docked, the earbud 81 of the earphone 80 is visible with the front of the mobile device 70.

Figure 7:
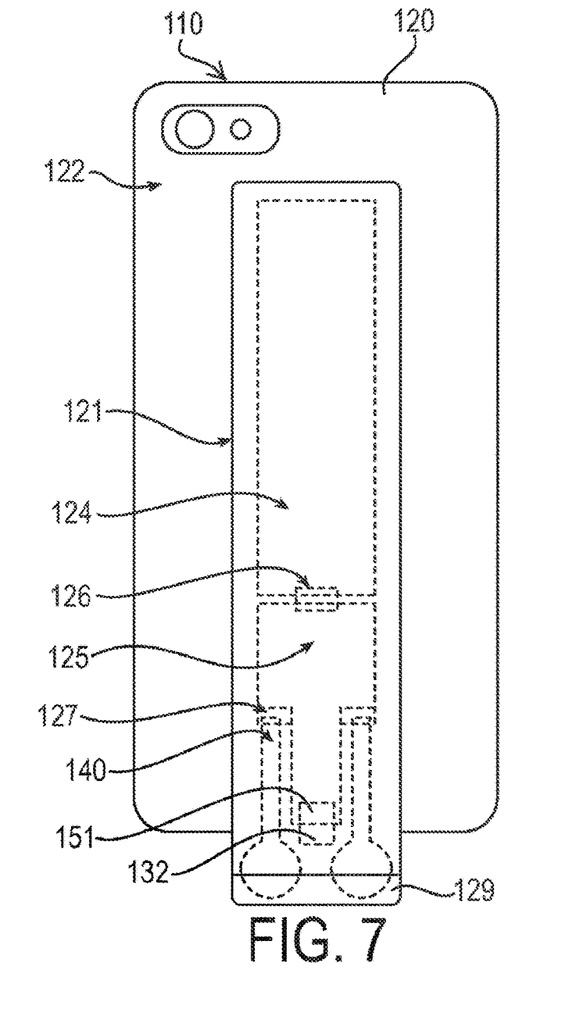
FIG. 7 is a rear view, partially in phantom, of another combination of a mobile device, an attachment module, and a pair of earphones.
Figure 8:
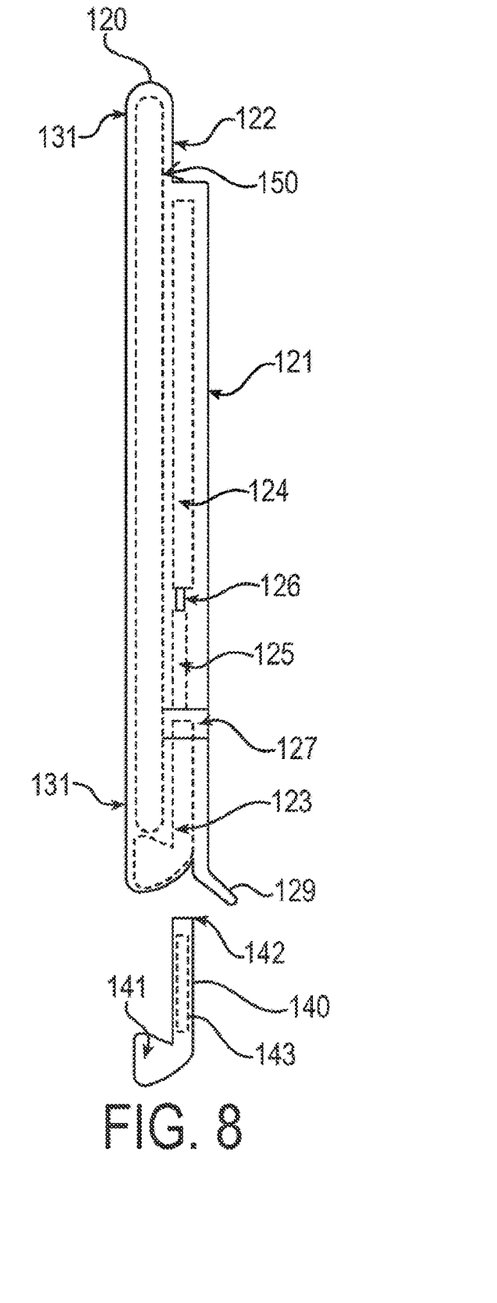
FIG. 8 is a partially exploded side view, partially in phantom, of the combination of FIG. 7, shown with the earphones removed.
Figure 9:
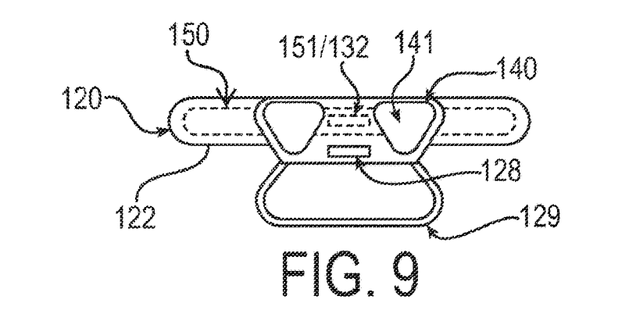
FIG. 9 is a bottom view, partially in phantom, of the combination of FIG. 7, shown with the lid open.
Figure 10:
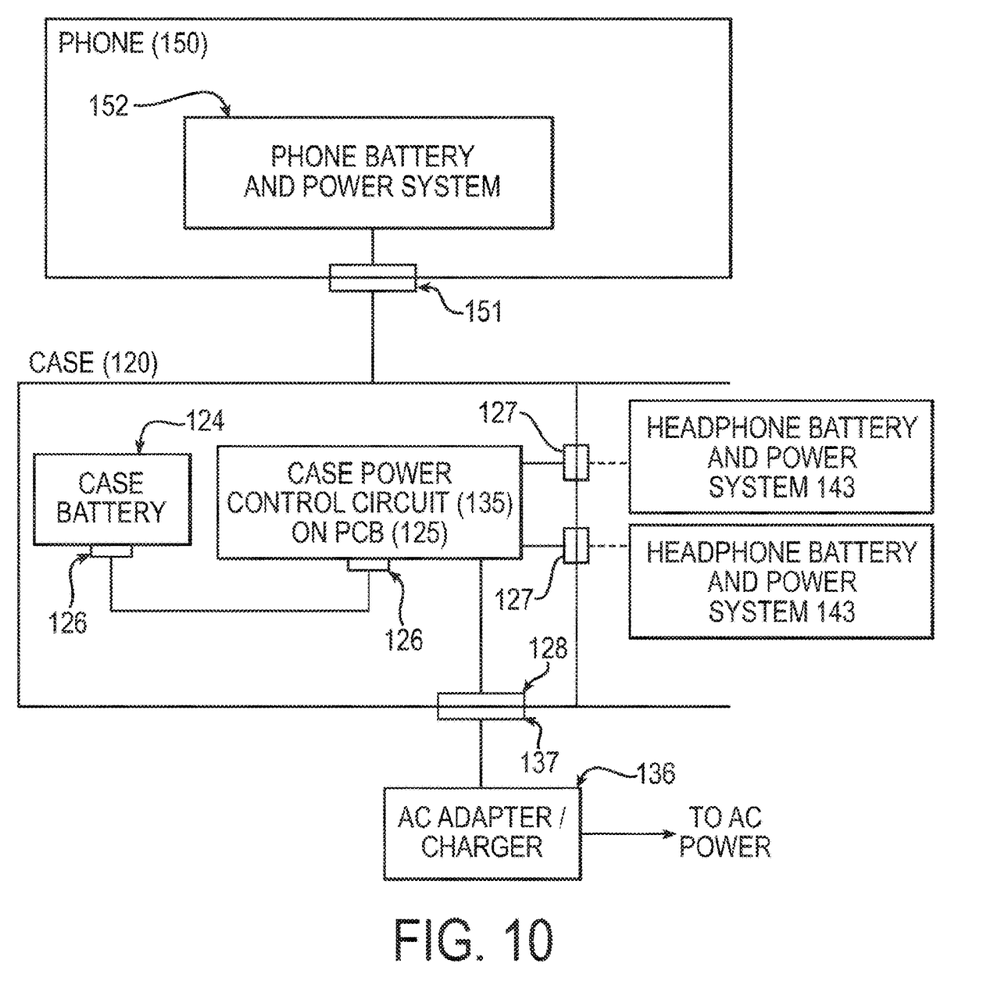
FIG. 10 is a schematic diagram of the power control circuit of the combination of the combination of FIG. 7.

There is a third embodiment shown in FIGS. 7, 8, and 9 with a schematic representation illustrated in FIG. 10.

A separable integrated mobile unit 110, includes a case unit 120, a mobile device 150, and one or more wireless headphones 140. The case unit 120 wraps around the mobile device 150, covering most of the back and the edges and leaving front of the mobile device exposed for unobstructed viewing during use, although coverage may vary as desired. There is one or more docking port 123 to allow a selected headphone 140 to be removably stored when not in use. In the illustrated embodiment, the docking port 123 consists of two cavities, one for each headphone 140. The docking port has a lid 129, shown in open position in FIGS. 8 and 9 for insertion and removal of the headphones in and out of the docking port. The lid 129 may be kept closed to keep dust and other foreign objects out of the cavities. In this exemplary embodiment, a charging connector 151 of the mobile device 150 can be made accessible when the lid 129 is open as shown in FIG. 9, and thus the mobile device 150 may be charged directly. The mobile device 150 may alternatively be charged via the module, e.g. case unit 120, as will be described below.

In the above described and illustrated embodiment, the case unit 120 provides two wireless headphones 140 to be associated with a smartphone, e.g. the mobile device 150. The combined unit 110 can be used as a normal smartphone when the headphones 140 are stored in their respective cavities of the docking port 123. Generally, the mobile device 150, e.g. a smartphone or tablets may be enabled for the user to conveniently select or deselect the headphones as needed. The case unit 120 may be made of flexible elastomeric material such as conventional cases for smartphones and tablets found in the market today, or any other suitable material. Headphones 140 can be removed from their cavities and charged when needed.

Additionally, in at least one embodiment, convenient charging of the headphones 140 along with that of the mobile device 150 is provided. This is further described below and illustrated in FIGS. 7-10.

As the phone 150 is fitted into the case unit 120, a connector 132, of the case unit, may mates with the charging connector 151 of the phone 150. Similarly, as the headphones 140 are inserted in their respective cavities of the docking port 123, the connector 127 of the case unit 120 mates with the headphone charging connector 142 of the headphone. Inside the case unit 120, the case power control circuit 35, located on the printed circuit board 125, stays permanently connected to the case battery 124 via the mating connector-pair 126. The case unit 120 also includes a charging connector 128, connected to case power control circuit 135.

As shown in FIG. 10, an eternal power source in the form of an AC adapter/charger 136 is connected via a connector 137 mating to the charging connector 128 of the case unit 120. Thus, when so connected, the case power control circuit 135 can provide power to the mobile device 150, the battery 124, and the headphones 140.

It must be understood that the above connections may be wired connections or wireless connections. The module 120 may include one or more inductive charging devices to convert magnetic potential to electric power to provide electric power or to convert electric power to magnetic potential to charge another deceive, such as the mobile device 150, with wireless charging capabilities.

In the above descriptions all charging connections have been noted as wired. But a variation of the above embodiment can be created for wireless charging. For example, if the phone 150 supports wireless charging, the connector 151 of the phone 150 will represent a wireless connection and the case unit 120 will be designed with the mating connection 131 to be a compatible wireless connection. Independently, if the headphone 140 supports wireless charging, the connection 142 of the headphone will represent a wireless connection and the case unit 120 will be designed with the mating connection 127 to be a compatible wireless connection.

The case unit 120 may be adapted for wired and/or wireless charging for the reception and/or transmission of power. In at least one embodiment, the case unit 120 employs the industry standard—the Qi standard—for wireless charging from Wireless Power Consortium for inductive charging over distances of up to 4 cm. The charger, external power source, may be a base station having a power management circuit and a primary flat coil to transmit inductive power. In such an example, the case unit 120 has its own flat coil to receive the said transmitted inductive power, which will be converted into normal electric power to charge the batteries in the headphone 140, the phone 150, and optionally in the case unit 120. Among many other suppliers, Integrated Device Technologies provides a number of components and application notes to help implement wireless charging in the development of products based on the current invention. Alternatively, or additional, the case can provide inductive charging, for example to the mobile device 150, via its own flat coil or via an additional flat coil.

In this illustrated example it is noted that in the docked state, the earbud 141, speaker portion of the earphone 140 is positioned in line with the mobile device 150.

Figure 11:
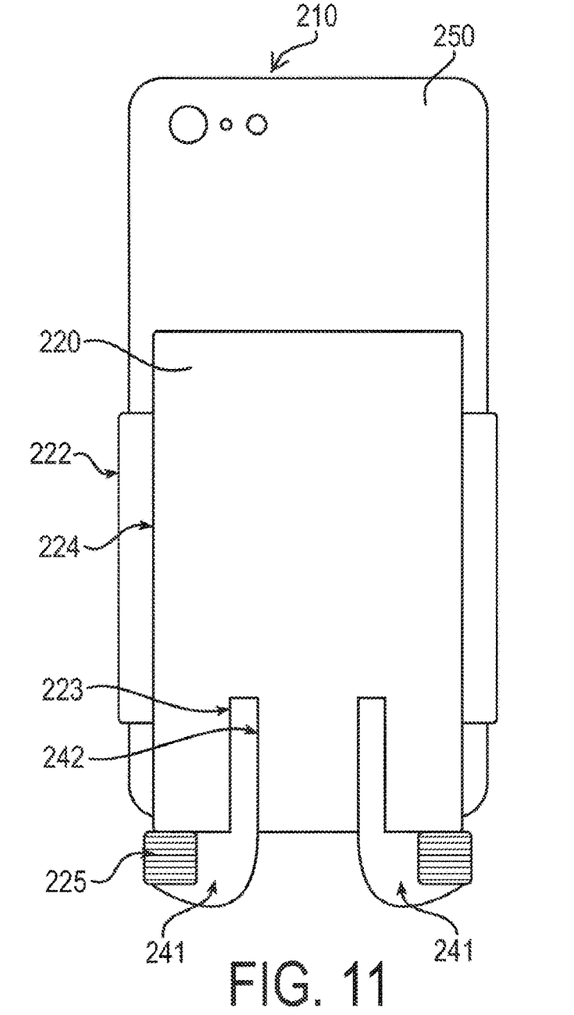
FIG. 11 is a is a rear view of another combination of a mobile device, an attachment module, and a pair of earphones.
Figure 12:
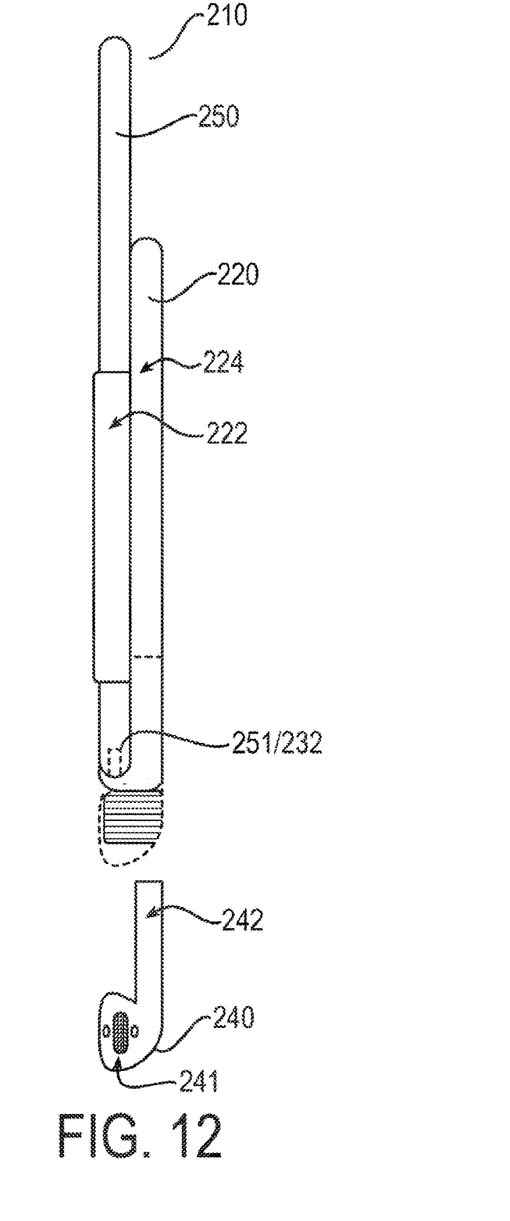
FIG. 12 is a partially exploded side view of the combination of FIG. 11, shown with the earphones removed
Figure 13:
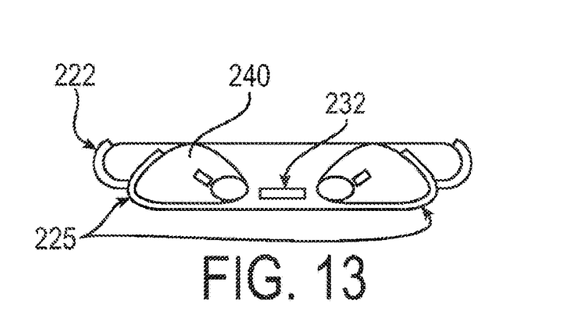
FIG. 13 is a bottom view of the combination of FIG. 11.
Figure 14:
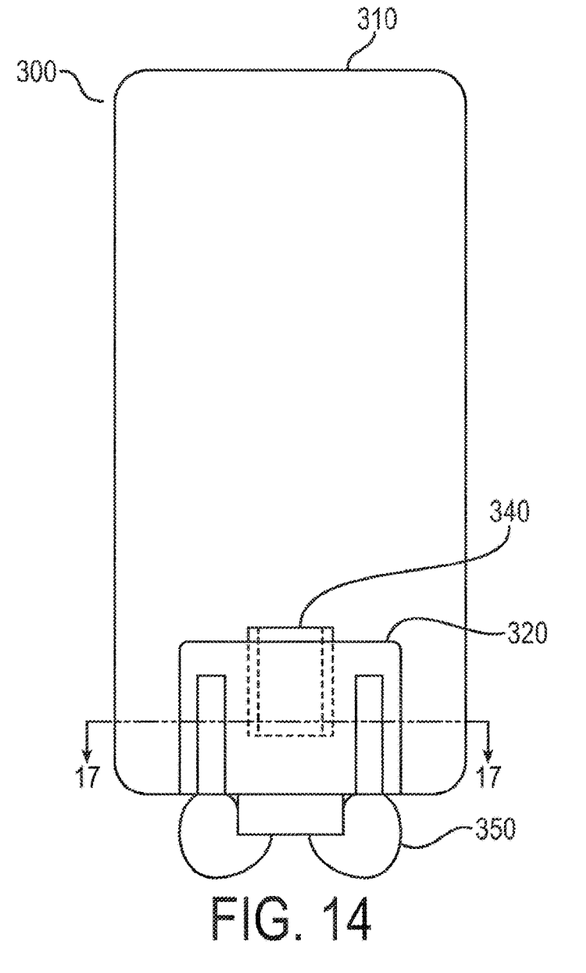
FIG. 14 is a is a rear view of another combination of a mobile device, an attachment module, and a pair of earphones.
Figure 15:
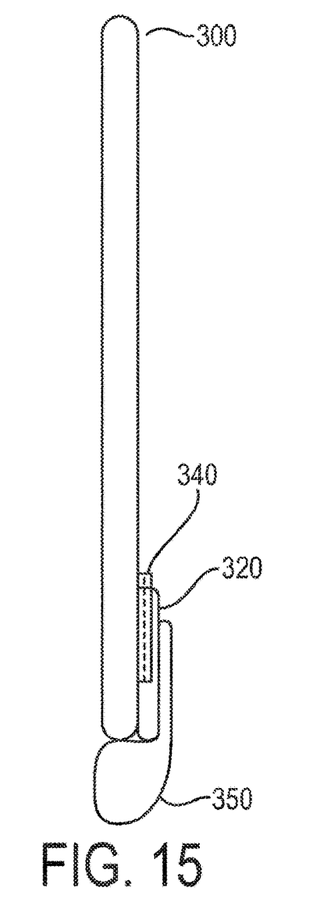
FIG. 15 is a side view of the combination of FIG. 14.
Figure 16:
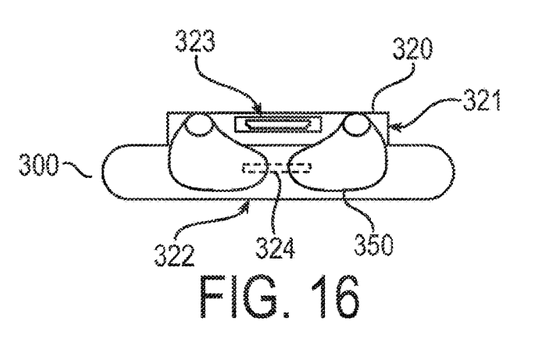
FIG. 16 is a bottom view of the combination of FIG. 14.
Figure 17:
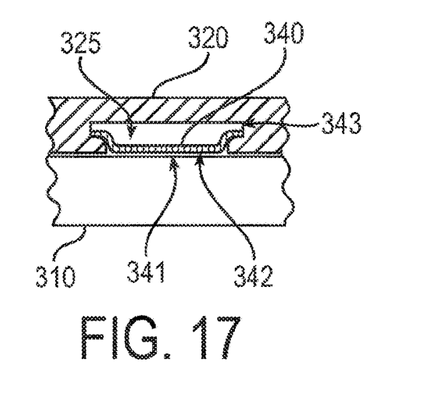
FIG. 17 is a partial cross-sectional view of a portion of the combination of FIG. 14

There is a fourth embodiment shown in FIGS. 11, 12, and 13. It must be understood that the schematic illustrated in FIG. 10, as it relates to the battery and power control circuit, may be incorporated into this embodiment with 100 added to the numeric identifiers as used in FIG. 10.

A separable integrated mobile unit 210 includes an attachment module 220, a mobile device 250, and one or more wireless headphones 240. The attachment module 220 wraps around the mobile device 250, covering a portion of the back of the mobile device 250 and engages edges of the mobile device 250. The module 220 includes one or more docking ports 223 to allow a selected headphone(s) 240 to be removeably stored. In this exemplary embodiment, as illustrated, the docking port 223 consists of two open slots, one for each headphone 240. It must be noted that in this embodiment the docking ports 223 are open slots without any associated over or lid.

In this example, the attachment module 220 provides two wireless headphones 240 to be coupled with the smartphone 250. The combined unit 210 is operational for the mobile device 250 to be used as normal as a smartphone when the headphones 240 are stored in their respective slots of the docking port 223. In operation, smartphones, tablets, or other device, the user may conveniently select or deselect the headphones as needed.

In this embodiment, charging of the headphones 240 and/or smartphone 250 may occur as described above.

Further, it must be noted that in this embodiment, the speaker portion of the earphone 240 is positioned in line with the planar length of the mobile device 250. It must also be noted that in the above arrangement the earbuds 241 of the docked earphone 240 is visible with the front of the mobile device 250, thereby highlighting the docked earphones feature of the mobile device 250.

There is a fifth embodiment shown in FIGS. 14, 15, 16, and 17. An attachment module 320 is shown attached to a mobile device 310 via a tab 340. The fixing mechanism, including tab 340, having an adhesive surface 342, which adheres to the rear surface of a mobile device 310. The attachment module 320 has a slot 325 shaped and sized to interlock with the tab 340, thereby securing the module to the mobile device 350. The tab 340 has a flat portion 341 and winged side portions 343, sized and shaped to fit in the slot 325.

The attachment module 320 includes a retaining mechanism to hold a pair of wireless earphones 350 in the form of a pair of cavities 321. The cavities 321 conforming to the stem portion of the earphones 350. Additional projections 323 and 322, securely hold in place the earbud portions of the earphones 350. The projection 323 also holds a charge connector similar to the charge connector 128 as shown in FIG. 10. The module 320 has a mating connector to the mobile module charge connector 151 as shown in FIG. 10. It must be noted that the retaining mechanism 321, described here, detachably holds the wireless earphones 350 in a position where the speaker portion of the earphone 350 is positioned in line with the planar length of the mobile device.

While principles and modes of operation have been explained and illustrated with regard to particular embodiments, it must be understood, however, that this may be practiced otherwise than as specifically explained and illustrated without departing from its spirit or scope.

What is claimed is:

1. An attachment module for coupling at least one add-on function with a mobile device comprising:
    a generally planar main body having an interior side for facing a back surface of the mobile device and an exterior side facing opposite the interior side, the main body including a recess and a slot on the interior side;
    add-on elements that make the at least one add-on function;
    a fixing mechanism for securing the main body to the mobile device, where the fixing mechanism is a tab having an adhesive portion on the interior side that binds to the back side of the mobile device, the tab is disposed in the recess and cooperating with the slot to retain the main body to the mobile device, and where the tab is detachable from a remaining portion of the module.

2. The attachment module of claim 1 further comprising:
    a power management circuit disposed in the main body and including a first connection for connecting an external power source to the power management circuit;
    a battery disposed in the main body and connected to power management circuit to store power from the circuit and provide power to the circuit; and
    the first connection is one of a wired connection and a wireless connection for inductive charging.

3. The attachment module of claim 2 where the power management circuit includes a second connection for connecting to the mobile device, where the power management circuit is capable of charging the mobile device, and where the second connection is one of a wired connection and a wireless connection for inductive charging.

4. An attachment module for coupling at least one add-on function with a mobile device comprising:
    a generally planar main body having an interior side for facing a back surface of the mobile device and an exterior side facing opposite the interior side and having a first end for engaging a first edge of the mobile device, the mobile device also having a second edge opposite and parallel the first edge, the second edge separated away from the main body;
    add-on elements that make the at least one add-on function, where the add-on element extends beyond the first end of the mobile device;
    a fixing mechanism for securing the main body to the mobile device, where the main body includes one or more securing arms, extending away from the main body, and formed on the interior side to engage third and fourth opposite edges of the mobile device which extend orthogonally from the first edge, and
    where a portion of the main body including the securing arms is detachable from the mobile device.

5. The attachment module of claim 4 further comprising:
    a power management circuit disposed in the main body and including a first connection for connecting an external power source to the power management circuit;
    a battery disposed in the main body and connected to power management circuit to store power from the circuit and provide power to the circuit; and the first connection is one of a wired connection and a wireless connection for inductive charging.

6. The attachment module of claim 5 where the power management circuit includes a second connection for connecting to the mobile device, where the power management circuit is capable of charging the mobile device, and where the second connection is one of a wired connection and a wireless connection for inductive charging.

\* \* \* \* \*